(12) United States Patent
Zhang et al.

(10) Patent No.: US 12,146,095 B2
(45) Date of Patent: Nov. 19, 2024

(54) pH-RESPONSIVE NANO-GEL PLUGGING MATERIAL, AND PREPARATION METHOD THEREFOR AND USE THEREOF

(71) Applicants: CHINA NATIONAL PETROLEUM CORPORATION, Beijing (CN); CNPC ENGINEERING TECHNOLOGY R&D COMPANY LIMITED, Beijing (CN)

(72) Inventors: Jie Zhang, Beijing (CN); Rongchao Cheng, Beijing (CN); Jie Feng, Beijing (CN); Zhiliang Zhao, Beijing (CN); Shuangwei Wang, Beijing (CN); Long Li, Beijing (CN); Tianyi Zhang, Beijing (CN)

(73) Assignees: CHINA NATIONAL PETROLEUM CORPORATION, Beijing (CN); CNPC ENGINEERING TECHNOLOGY R & D COMPANY LIMITED, Beting (CN)

( * ) Notice: Subject to any disclaimer, the term of this patent is extended or adjusted under 35 U.S.C. 154(b) by 0 days.

(21) Appl. No.: 18/354,616

(22) Filed: Jul. 18, 2023

(65) Prior Publication Data
US 2023/0365853 A1 Nov. 16, 2023

Related U.S. Application Data

(63) Continuation of application No. PCT/CN2022/074520, filed on Jan. 28, 2022.

(30) Foreign Application Priority Data

Jul. 7, 2021 (CN) .......................... 202110777697.3

(51) Int. Cl.
*C09K 8/508* (2006.01)
*C09K 8/035* (2006.01)
*C09K 8/42* (2006.01)

(52) U.S. Cl.
CPC ............ *C09K 8/5083* (2013.01); *C09K 8/035* (2013.01); *C09K 8/426* (2013.01)

(58) Field of Classification Search
None
See application file for complete search history.

(56) References Cited

U.S. PATENT DOCUMENTS 4,811,789 A 3/1989 Jennings, Jr. et al.
7,306,040 B1 * 12/2007 Robb ..................... C09K 8/512
166/300

(Continued)

FOREIGN PATENT DOCUMENTS

CN 103694413 A 4/2014
CN 104391323 A 3/2015

(Continued)

OTHER PUBLICATIONS

Chinese Novelty Search Report in "A pH responsive nano gel plugging material and its preparation method and application," China Patent Information Center, entrusted May 28, 2021, Entrusting Agency: Beijing sanyou Intellectual Property Agency, Co., Ltd., 10 pages.

(Continued)

*Primary Examiner* — John J Figueroa
(74) *Attorney, Agent, or Firm* — Hoffman Warnick LLC

(57) ABSTRACT

Provided in the present invention are a pH-responsive nano-gel plugging material, and a preparation method therefor and the use thereof. The pH-responsive nano-gel plugging material comprises the following raw materials in parts by mass: 50-70 parts of water, 2-3 parts of an emulsifier, 25-35 parts (Continued)

of an acrylic terpolymer, 10-15 parts of a polyalcohol compound, and 10-20 parts of a vinyl pyridine compound. The pH-responsive nano-gel plugging material can be applied to the plugging of Ordovician carbonate rock fractures and micro-karst cave strata, and can automatically identify Ordovician carbonate rock fractures and micro-karst cave leaking layers and realize effective blocking thereof.

13 Claims, 3 Drawing Sheets

(56) References Cited

U.S. PATENT DOCUMENTS

| | | | |
|---|---|---|---|
| 9,074,125 B1 | 7/2015 | Lahalih | |
| 10,414,970 B2 | 9/2019 | Tamsilian et al. | |
| 2006/0144595 A1* | 7/2006 | Milligan | E21B 41/02 166/305.1 |
| 2007/0277981 A1* | 12/2007 | Robb | C09K 8/512 166/300 |
| 2007/0281870 A1* | 12/2007 | Robb | C09K 8/035 507/221 |
| 2020/0207927 A1 | 7/2020 | Tasque et al. | |
| 2023/0203361 A1* | 6/2023 | Deville | C09K 8/68 507/130 |

FOREIGN PATENT DOCUMENTS

| | | |
|---|---|---|
| CN | 105199688 A | 12/2015 |
| CN | 106433584 A | 2/2017 |
| CN | 106947439 A | 7/2017 |
| CN | 108531159 A | 9/2018 |
| CN | 109666465 A | 4/2019 |
| CN | 109796949 A | 5/2019 |
| CN | 110317296 A | 10/2019 |
| CN | 110373168 A | 10/2019 |
| CN | 110396151 A | 11/2019 |
| CN | 110540831 A | 12/2019 |
| CN | 110734751 A | 1/2020 |
| CN | 111393557 A | 7/2020 |
| CN | 111574973 A | 8/2020 |
| CN | 112250787 A | 1/2021 |
| CN | 112480887 A | 3/2021 |
| CN | 112552449 A | 3/2021 |
| CN | 112694562 A | 4/2021 |
| CN | 112877045 A | 6/2021 |
| CN | 112898623 A | 6/2021 |
| CN | 113024721 A | 6/2021 |

OTHER PUBLICATIONS

Fang, Z., "Synthesis and characterization of the pH-sensitive hydrogels," Huazhong University of Science & Technology, Jan. 2012, Master's Thesis, Wuhan, China, 88 pages.
International Search Report in PCT/CN2022/074520, mailed Apr. 29, 2022, 3 pages.
First Office Action and search report issued on May 31, 2023 for counterpart Chinese patent application No. 202110777697.3.
Chaichun Peng et al., Polymer Synthetic Materials Science, Beijing Institute of Technology Press.
Yinghua Shen et al., Preparation and pH Responsive Property of Poly (HEMA-co-MAA) Nangels, Polymer Materials Science and Engineering, vol. 28 No. 10.
Decision of Rejection issued on Dec. 19, 2023 for counterpart Chinese patent application No. 202110777697.3.

* cited by examiner pH-RESPONSIVE NANO-GEL PLUGGING MATERIAL, AND PREPARATION METHOD THEREFOR AND USE THEREOF

CROSS-REFERENCE TO RELATED APPLICATIONS

This application is a continuation of International Application No. PCT/CN2022/074520, filed on Jan. 28, 2022, which claims priority to Chinese Patent Application No. 202110777697.3, filed on Jul. 7, 2021, both of which are hereby incorporated by reference in their entireties.

TECHNICAL FIELD

The present invention belongs to the technical field of petroleum exploration and rock excavation, and relates to a pH-responsive nano-gel plugging material and its preparation method and use.

BACKGROUND

With the development of fractures and cavities of Ordovician strata, the calcium ion content in the stratum water is generally 5000 mg/L or above, with a pH value generally from 5.0 to 7.0. Carbonate fractures and cavities are mainly formed through dissolution of carbonate rocks by acidic stratum water. Fractures and cavities are developed in the Ordovician carbonate reservoir sections, and since fractures and cavities are prone to seepage and small to medium-sized leakage, it is an unresolved challenge to achieve rapid identification and rapid plugging of the leakage stratum.

SUMMARY OF INVENTION

An object of the present invention is to provide a plugging material that can be applied to plug the fractures and micro-cavities of strata of Ordovician carbonate rocks, and the plugging material can automatically identify and effectively plug the fractures and micro-cavities of leakage strata of Ordovician carbonate rocks.

In order to achieve the above object, the present invention provides a pH-responsive nano-gel plugging material, wherein the raw materials for the pH-responsive nano-gel plugging material comprises, in parts by mass, 50-70 parts of water, 2-3 parts of an emulsifier, 25-35 parts of an acrylic terpolymer, 10-15 parts of a polyol-based compound, and 10-20 parts of a vinyl pyridine-based compound.

The above pH-responsive nano-gel plugging material can be used in drilling fluid. The above pH-responsive nano-gel plugging material has a very low swelling rate in an alkaline fluid environment, and because drilling fluid is usually alkaline fluid, the above pH-responsive nano-gel plugging material is in a shrunk state with slight swelling in alkaline drilling fluid However, once it reaches Ordovician carbonate strata with fractures and micro-cavities, the permeability suddenly increases, and the above pH-responsive nano-gel plugging material in the alkaline environment (with an pH value generally >9) instantly leaches into an acidic environment. The above-mentioned nano-gel material entering into the acidic environment swells and expands rapidly, which provides a good plugging effect, thereby realizing automatic identification of fractures and micro-cavities of leakage strata of Ordovician carbonate rocks while achieving excellent leakage preventing and plugging effects.

In the above pH-responsive nano-gel plugging material, preferably, said water is selected from a deionized water.

In the above pH-responsive nano-gel plugging material, preferably, said emulsifier comprises one of a polyoxyethylene alcohol, a polyoxyethylene ether, OP-7, OP-8, OP-9, OP-10 and the like, or a combination of two or more thereof.

In the above pH-responsive nano-gel plugging material, preferably, said polyol-based compound comprises one of a polyethylene glycol, a polyvinyl alcohol, a polypropylene glycol, a polycaprolactone polyol and the like, or a combination of two or more thereof.

In the above pH-responsive nano-gel plugging material, preferably, said vinyl pyridine-based compound comprises one of trans-4-arylvinylpyridine, 2-vinylpyridine, styrylpyridine, 4-styrylpyridine and the like, or a combination of two or more thereof.

In the above pH-responsive nano-gel plugging material, preferably, said acrylic terpolymer is obtained by polymerizing a first monomer, a second monomer, and a third monomer; wherein said first monomer comprises one of methacrylic acid, ethylacrylic acid, acrylate, and hydroxyethyl methacrylate, or a combination of two or more thereof (wherein the acrylate preferably comprises one of ethyl acrylate, butyl acrylate, isooctyl acrylate, methyl acrylate, and methyl methacrylate, or a combination of two or more thereof), said second monomer comprises one of vinyltrimethoxysilane, vinyltriethoxysilane, vinyltris(2-methoxyethoxy)silane, vinyltriisopropoxysilane, and gamma-methacryloxypropyl trimethoxysilane or a combination of two or more thereof, and said third monomer comprises one of acrylamide, hydroxymethylacrylamide, styrene, acrylonitrile, vinyl chloride, vinyl acetate, and maleic anhydride, or a combination of two or more thereof.

More preferably, the mass ratio of the amount of the first monomer:the second monomer:the third monomer is 40-60:20-30:10-15.

More preferably, said acrylic terpolymer is prepared by: adding a sodium hydroxide solution to an aqueous solution of the first monomer in an ice-water bath to partially neutralize the first monomer to obtain a solution A; adding the second monomer and the third monomer to the solution A at room temperature, and then adding an initiator to carry out a polymerization reaction in an inert environment; upon completion of the polymerization reaction, drying and crushing the product, and sealing for further use; further preferably, said initiator comprises one of dimethyl azodiisobutyrate, azodiisopropylimidazoline hydrochloride, azodiisobutyronitrile, azodiisoheptanonitrile, potassium persulfate, sodium persulfate, ammonium persulfate, and cumene hydroperoxide or a combination of two or more thereof; more preferably, the mass ratio of the amount of said initiator:the first monomer:the second monomer:the third monomer is 1-5:40-60:20-30:10-15.

In a specific embodiment, said acrylic terpolymer is prepared by:

adding an aqueous solution of 40-60 parts by mass of a first monomer in a beaker, and slowly adding 10-20 parts by mass of a sodium hydroxide solution with a mass concentration of 20% (based on 100% of the total mass of the sodium hydroxide solution) under stirring in an ice-water bath to partially neutralize the first monomer to obtain a solution A; after cooling the solution A to room temperature, adding 20-30 parts by mass of a second monomer, 10-15 parts by mass of a third monomer, mixing well and introducing nitrogen for 30 minutes; adding 1-5 parts by mass of an initiator for polymerization; removing the colloidal product upon completion of the reaction, cutting it into pieces which are then put in an 80° C. drying oven to dry to constant weight; pulverizing, passing through a 100-mesh sieve, and sealing for later use.

The present invention also provides a method for preparing the aforementioned pH-responsive nano-gel plugging material, wherein the method comprises:

mixing water, a polyol-based compound and a vinyl pyridine-based compound, followed by addition of an emulsifier and an acrylic terpolymer and uniform mixing under stirring, to obtain said pH-responsive nano-gel plugging material.

The present invention also provides use of the aforementioned pH-responsive nano-gel plugging material in alkaline drilling fluid.

Ordovician carbonate reservoirs are characterized by a calcium ion content in the stratum water of generally 5000 mg/L or above and a pH value generally from 5.0 to 7.0. Starting from the characteristics of Ordovician carbonate reservoirs, the present invention proposes a plugging material that can selectively achieve plugging in the pH range of Ordovician carbonate reservoirs. The pH-responsive nano-gel plugging material provided by the present invention swells drastically only when the pH value is less than 5-7, and performs a rapid plugging. The pH-responsive nano-gel plugging material provided by the present invention is in a shrunk state in a drilling fluid with a pH value of greater than 9, and the pH-responsive nano-gel plugging material does not swell. However, once it leaches into a carbonate reservoir, the pH value instantly drops below 7, especially when the calcium ion content in the stratum water is generally 5000 mg/L or above, the pH-responsive nano-gel plugging material swells dramatically and performs a rapid plugging.

DETAILED DESCRIPTION OF THE INVENTION

Figure 1A:
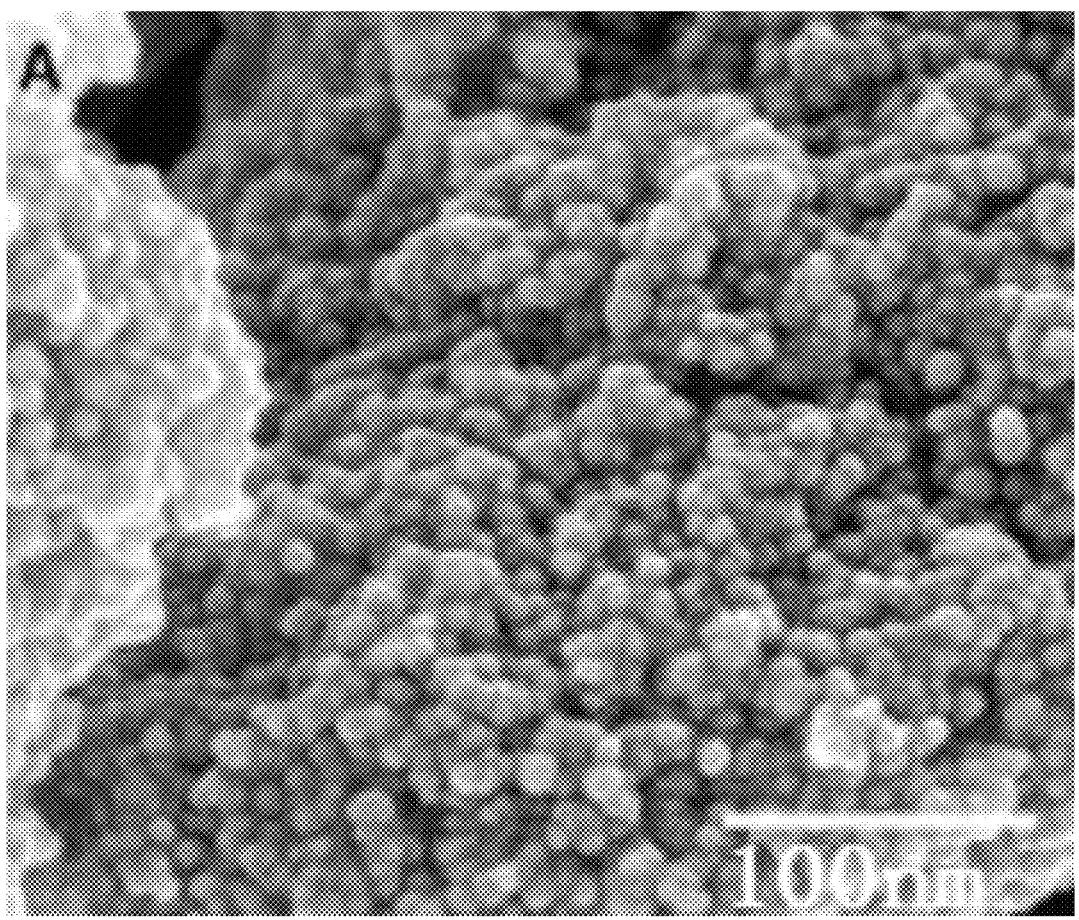
FIG. 1A shows a graph of the gel state of the pH-responsive nano-gel plugging material provided in Example 1 at pH=7 (5000× magnification).

For a better understanding of the technical features, objectives and beneficial effects of the present invention, the technical solutions of the present invention are described in details hereinafter, which is not to be construed as limitation to the implementable scope of the present invention.

Example 1

This example provides a pH-responsive nano-gel plugging material which is prepared by the following steps:
1) Preparation of Acrylic Terpolymer 60 parts by mass of methacrylic acid was put in a beaker, and 16 parts by mass of sodium hydroxide solution with a mass concentration of 20% (based on 100% of the total mass of sodium hydroxide solution) was added slowly under stirring in an ice-water bath to partially neutralize the methacrylic acid to obtain a solution A. After the solution A was cooled to room temperature, 20 parts by mass of vinyltrimethoxysilane and 15 parts by mass of hydroxymethylacrylamide were added and mixed evenly, and nitrogen was charged for 30 minutes. 3 parts by mass of dimethyl azodiisobutyrate was added for polymerization. After the polymerization reaction was completed, the colloidal product was removed, cut into pieces, and then put in an drying oven at 80° C. to dry to constant weight, pulverized, passed through a 100-mesh sieve, and sealed for later use.

2) Preparation of pH-Responsive Nano-Gel Plugging Material 70 parts by weight of deionized water, 10 parts by weight of polyethylene glycol (molecular weight 170,000, alcoholysis degree 88%), 15 parts by weight of styrylpyridine were mixed evenly under stirring for 10 minutes, 3 parts by weight of polyoxyethylene glycol and parts by weight of the acrylic terpolymer prepared in step 1) were then added, and the stirring was continued at low speed (80 rpm) for 30 minutes to obtain a finished product. The finished product was put into a drying oven at 50° C. and dried to a constant weight, and then pulverized, sieved through a 100-mesh sieve and sealed for later use.

Example 2

This example provides a pH-responsive nano-gel plugging material which was prepared by the following steps:
1) Preparation of Acrylic Terpolymer 40 parts by mass of methacrylic acid was put in a beaker, and 13 parts by mass of sodium hydroxide solution with a mass concentration of 20% (based on 100% of the total mass of sodium hydroxide solution) was added slowly under stirring in an ice-water bath to partially neutralize the methacrylic acid to obtain a solution A. After the solution A was cooled to room temperature, 30 parts by mass of vinyltriethoxysilane and 15 parts by mass of vinyl acetate were added and mixed evenly, and nitrogen was charged for 30 minutes. 5 parts by mass of dimethyl azodiisobutyrate was added for polymerization. After the polymerization reaction was completed, the colloidal product was removed, cut into pieces, and then put in an drying oven at 80° C. to dry to constant weight, pulverized, passed through a 100-mesh sieve, and sealed for later use.

2) Preparation of pH-Responsive Nano-Gel Plugging Material 60 parts by weight of deionized water, 10 parts by weight of polyethylene glycol (molecular weight 120,000, alcoholysis degree 78%), 20 parts by weight of 4-styrylpyridine were mixed evenly under stirring for 10 minutes, 2 parts by weight of OP-7 and 25 parts by weight of the acrylic terpolymer prepared in step 1) were then added, and the stirring was continued at low speed (80 rpm) for 30 minutes to obtain a finished product. The finished product was put into a drying oven at 50° C. and dried to a constant weight, and then pulverized, sieved through a 100-mesh sieve and sealed for later use.

Example 3

This example provides a pH-responsive nano-gel plugging material which was prepared by the following steps:
1) Preparation of Acrylic Terpolymer 50 parts by mass of ethylacrylic acid was put in a beaker, and 18 parts by mass of sodium hydroxide solution with a mass concentration of 20% (based on 100% of the total mass of sodium hydroxide solution) was added slowly under stirring in an ice-water bath for partial neutralization to obtain a solution A. After the solution A was cooled to room temperature, 25 parts by mass of gamma-methacryloxypropyl trimethoxysilane and 15 parts by mass of acrylonitrile were added and mixed evenly, and nitrogen was charged for 30 minutes. 5 parts by mass of sodium persulfate was added for polymerization. After the polymerization reaction was completed, the colloidal product was removed, cut into pieces, and then put in an drying oven at 80° C. to dry to constant weight, pulverized, passed through a 100-mesh sieve, and sealed for later use.

2) Preparation of pH-Responsive Nano-Gel Plugging Material 50 parts by weight of deionized water, 12 parts by weight of polycaprolactone polyol (acid value 21 mgKOH/g, alcoholysis degree 78%, molecular weight 10,000-40,000), 10 parts by weight of styrylpyridine were mixed evenly under stirring for 10 minutes, 3 parts by weight of OP-9 and 25 parts by weight of the acrylic terpolymer prepared in step 1) were then added, and the stirring was continued at low speed (80 rpm) for 30 minutes to obtain a finished product. The finished product was put into a drying oven at 50° C. and dried to a constant weight, and then pulverized, sieved through a 100-mesh sieve and sealed for later use.

Example 4

This example provides a pH-responsive nano-gel plugging material which was prepared by the following steps:
1) Preparation of Acrylic Terpolymer 55 parts by mass of hydroxyethyl methacrylate was put in a beaker, and 17 parts by mass of sodium hydroxide solution with a mass concentration of 20% (based on 100% of the total mass of sodium hydroxide solution) was added slowly under stirring in an ice-water bath for partial neutralization to obtain a solution A. After the solution A was cooled to room temperature, 25 parts by mass of vinyltriisopropoxysilane and 12 parts by mass of vinyl chloride were added and mixed evenly, and nitrogen was charged for 30 minutes. 5 parts by mass of azodiisoheptanonitrile was added for polymerization. After the polymerization reaction was completed, the colloidal product was removed, cut into pieces, and then put in an drying oven at 80° C. to dry to constant weight, pulverized, passed through a 100-mesh sieve, and sealed for later use.

2) Preparation of pH-Responsive Nano-Gel Plugging Material 60 parts by weight of deionized water, 2 parts by weight of highly polymerized polyethylene glycol (molecular weight 200,000, alcoholysis degree 88%), 10 parts by weight of 2-vinylpyridine were mixed evenly under stirring for 10 minutes, 2 parts by weight of polyoxyethylene ether:OP-10 (at a volume ratio of 1:1) and 26 parts by weight of the acrylic terpolymer prepared in step 1) were then added, and the stirring was continued at low speed (80 rpm) for 30 minutes to obtain a finished product. The finished product was put into a drying oven at 50° C. and dried to a constant weight, and then pulverized, sieved through a 100-mesh sieve and sealed for later use.

Example 5

1) Preparation of Acrylic Terpolymer 40 parts by mass of acrylate was put in a beaker, and 14 parts by mass of sodium hydroxide solution with a mass concentration of 20% (based on 100% of the total mass of sodium hydroxide solution) was added slowly under stirring in an ice-water bath for partial neutralization to obtain a solution A. After the solution A was cooled to room temperature, 25 parts by mass of vinyltri(2-methoxy ethoxy) silane and 15 parts by mass of maleic anhydride were added and mixed evenly, and nitrogen was charged for 30 minutes. 5 parts by mass of cumene hydroperoxide was added for polymerization. After the polymerization reaction was completed, the colloidal product was removed, cut into pieces, and then put in an drying oven at 80° C. to dry to constant weight, pulverized, passed through a 100-mesh sieve, and sealed for later use.

2) Preparation of pH-Responsive Nano-Gel Plugging Material 50 parts by weight of deionized water, 15 parts by weight of polypropylene glycol (molecular weight 140,000, alcoholysis degree 98%), 10 parts by weight of 2-vinylpyridine were mixed evenly under stirring for 10 minutes, 2 parts by weight of OP-9 and 25 parts by weight of the acrylic terpolymer prepared in step 1) were then added, and the stirring was continued at low speed (80 rpm) for 30 minutes to obtain a finished product. The finished product was put into a drying oven at 50° C. and dried to a constant weight, and then pulverized, sieved through a 100-mesh sieve and sealed for later use.

Experiment Example

Hydrochloric acid and sodium hydroxide were respectively used to prepare aqueous solutions having various pH, and the pH-responsive nano-gel plugging materials prepared in Examples 1-5 which were weighed at a certain mass were added thereto. After being fully soaked, the materials were removed, wiped off the surface water with dry filter paper, weighed, and the swelling rate at different pH values was calculated.

Figure 1B:
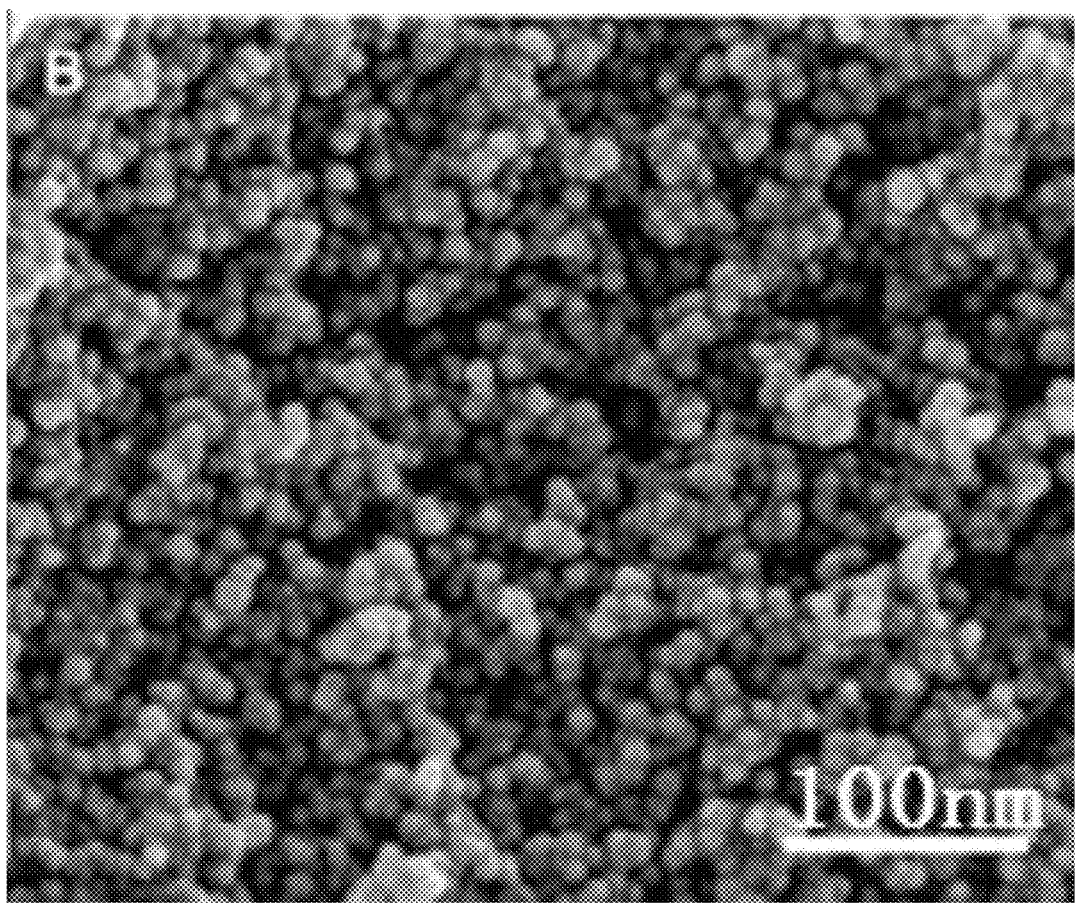
FIG. 1B shows a graph of the gel state of the pH-responsive nano-gel plugging material provided in Example 1 at pH=9 (3000× magnification).
Figure 1C:
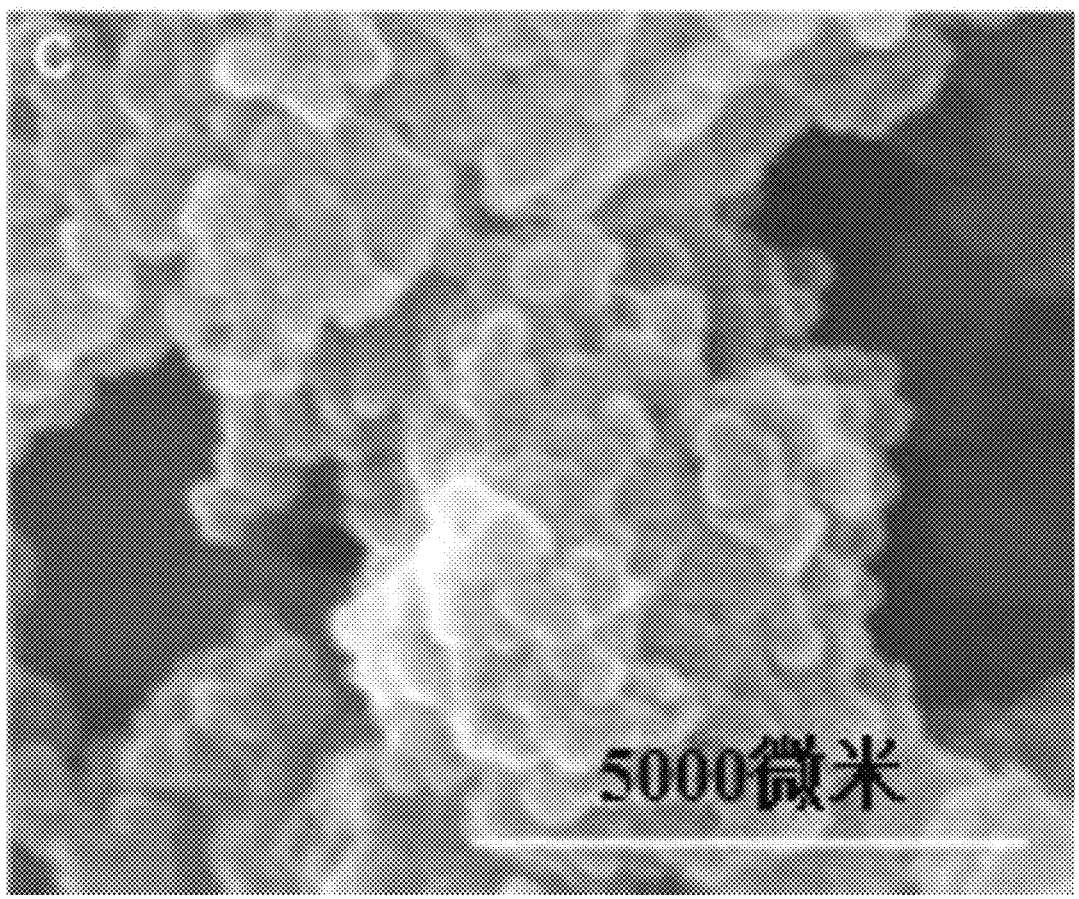
FIG. 1C shows a graph of the gel state of the pH-responsive nano-gel plugging material provided in Example 1 at pH=5 (100× magnification).

The experimental results are shown in Table 1 and FIG. 1A-FIG. 1C. The swelling rate was 1-15 g/g when the pH was in the range of 8-10, and 1000-1400 g/g when the pH was in the range of 4-6. With instant swelling by 100 times or more, the materials agglomerated to perform a plugging function, as shown in FIG. 1C.

TABLE 1

Equilibrium swelling rate of pH-responsive nano-gels at different pH values

| Item | pH = 10 | pH = 9 | pH = 8 | pH = 7 | pH = 6 | pH = 5 | pH = 4 |
|---|---|---|---|---|---|---|---|
| Swelling rate of the plugging material of Example 1 (g/g) | 2 | 7 | 14 | 120 | 900 | 1200 | 1600 |
| Swelling rate of the plugging material of Example 2 (g/g) | 3 | 6 | 10 | 145 | 1100 | 1400 | 1600 |
| Swelling rate of the plugging material of Example 3 (g/g) | 2 | 8 | 12 | 110 | 1060 | 1250 | 1500 |
| Swelling rate of the plugging material of Example 4 (g/g) | 2 | 6 | 15 | 122 | 1100 | 1400 | 1500 |
| Swelling rate of the plugging material of Example 5 (g/g) | 1 | 7 | 17 | 138 | 1150 | 1200 | 1500 |

Preferred embodiments of the present invention have been described above with reference to the accompanying drawings. Many of the features and advantages of these embodiments are clear according to this detailed specification, and therefore the claims are intended to cover all such features and advantages of these embodiments that fall within the true spirit and scope thereof. Furthermore, many modifications and alterations are readily conceivable to those skilled in the art, and therefore it is not intended that the embodiments of the invention be limited to the precise structure and operation as exemplified and described, but that all suitable modifications and equivalents falling within their scope may be covered.

The invention claimed is:

1. A pH-responsive nano-gel plugging material, wherein the raw materials for the pH-responsive nano-gel plugging material comprises, in parts by mass, 50-70 parts of water, 2-3 parts of an emulsifier, 25-35 parts of an acrylic terpolymer, 10-15 parts of a polyol-based compound, and 10-20 parts of a vinyl pyridine-based compound.

2. The plugging material according to claim 1, wherein said emulsifier comprises one of a polyoxyethylene alcohol, a polyoxyethylene ether, OP-7, OP-8, OP-9, and OP-10, or a combination of two or more thereof.

3. The plugging material according to claim 1, wherein said polyol-based compound comprises one of a polyethylene glycol, a polyvinyl alcohol, a polypropylene glycol, and a polycaprolactone polyol, or a combination of two or more thereof.

4. The plugging material according to claim 1, wherein said vinyl pyridine-based compound comprises one of trans-4-arylvinylpyridine, 2-vinylpyridine, styrylpyridine, and 4-styrylpyridine, or a combination of two or more thereof.

5. The plugging material according to claim 1, wherein said acrylic terpolymer is obtained by polymerizing a first monomer, a second monomer, and a third monomer; wherein:
    said first monomer comprises one of methacrylic acid, ethylacrylic acid, acrylate, and hydroxyethyl methacrylate, or a combination of two or more thereof,
    said second monomer comprises one of vinyltrimethoxysilane, vinyltriethoxysilane, vinyltris(2-methoxyethoxy)silane, vinyltriisopropoxysilane, and gamma-methacryloxypropyl trimethoxysilane, or a combination of two or more thereof, and
    said third monomer comprises one of acrylamide, hydroxymethylacrylamide, styrene, acrylonitrile, vinyl chloride, vinyl acetate, and maleic anhydride, or a combination of two or more thereof.

6. The plugging material according to claim 5, wherein said acrylate comprises one of ethyl acrylate, butyl acrylate, isooctyl acrylate, methyl acrylate, and methyl methacrylate, or a combination of two or more thereof.

7. The plugging material according to claim 5, wherein the mass ratio of the amount of the first monomer:the second monomer:the third monomer is 40-60:20-30:10-15.

8. The plugging material according to claim 6, wherein the mass ratio of the amount of the first monomer:the second monomer:the third monomer is 40-60:20-30:10-15.

9. The plugging material according to any one of claim 5, wherein said acrylic terpolymer is prepared by
    adding a sodium hydroxide solution to an aqueous solution of the first monomer in an ice-water bath to partially neutralize the first monomer to obtain a solution A;
    adding the second monomer and the third monomer to the solution A at room temperature, and then adding an initiator to carry out a polymerization reaction in an inert environment;
    upon completion of the polymerization reaction, drying and crushing the product, and sealing for further use.

10. The plugging material according to claim 9, wherein said initiator comprises one of dimethyl azodiisobutyrate, azodiisopropylimidazoline hydrochloride, azodiisobutyronitrile, azodiisoheptanonitrile, potassium persulfate, sodium persulfate, ammonium persulfate, and cumene hydroperoxide, or a combination of two or more thereof.

11. The plugging material according to claim 10, wherein the mass ratio of the amount of said initiator:the first monomer:the second monomer:the third monomer is 1-5:40-60:20-30:10-15.

12. The plugging material according to claim 10, wherein said water is deionized water.

13. A method for preparing the pH-responsive nano-gel plugging material according to any one of claim 1, wherein the method comprises:
    mixing water, a polyol-based compound and a vinyl pyridine-based compound, followed by addition of an emulsifier and an acrylic terpolymer, and uniformly mixing them under stirring, to obtain said pH-responsive nano-gel plugging material.

* * * * *

UNITED STATES PATENT AND TRADEMARK OFFICE
CERTIFICATE OF CORRECTION

PATENT NO. : 12,146,095 B2  
APPLICATION NO. : 18/354616  
DATED : November 19, 2024  
INVENTOR(S) : Zhang et al.

Page 1 of 1

It is certified that error appears in the above-identified patent and that said Letters Patent is hereby corrected as shown below:

On the Title Page

Item (73), in Assignees, Line 4, delete "R & D" and insert -- R&D --, therefor.

Item (73), in Assignees, Line 5, delete "Beting (CN)" and insert -- Beijing (CN) --, therefor.

In the Claims

In Column 7, Claim 5, Line 27, delete "monomer;" and insert -- monomer, --, therefor.

In Column 8, Claim 9, Line 9, delete "to any one of claim 5," and insert -- to claim 5, --, therefor.

In Column 8, Claim 9, Line 10, delete "by" and insert -- by: --, therefor.

In Column 8, Claim 13, Line 35, delete "to any one of claim 1," and insert -- to claim 1, --, therefor.

Signed and Sealed this  
Twenty-first Day of January, 2025

Coke Morgan Stewart  
*Acting Director of the United States Patent and Trademark Office*